Dec. 15, 1931.  K. SCHMIDT  1,836,088

CONTROL SYSTEM FOR DIRECT CURRENT MACHINES

Filed April 10, 1928

INVENTOR
Karl Schmidt.

BY Otto Ratz
ATTORNEY.

Patented Dec. 15, 1931

1,836,088

UNITED STATES PATENT OFFICE

KARL SCHMIDT, OF BERLIN-LICHTENRADE, GERMANY, ASSIGNOR TO C. LORENZ AKTIENGESELLSCHAFT, OF BERLIN-TEMPELHOF, GERMANY

CONTROL SYSTEM FOR DIRECT CURRENT MACHINES

Application filed April 10, 1928, Serial No. 268,943, and in Germany April 30, 1927.

This invention relates to a system for controlling the voltage or the speed of direct current machines and its object is to supply means which will permit a rapid change of field excitation of such machines for the purpose of controlling the voltage.

Another object of this invention is to provide means for improving the regulating characteristics of vibrating type of regulators such as the Tirrill regulator, for keeping the voltage constant, or a vibrating regulator for keeping the speed constant.

A further object is to provide means for controlling the excitation of large machines without any considerable consumption of energy in the control apparatus.

Figure 1:
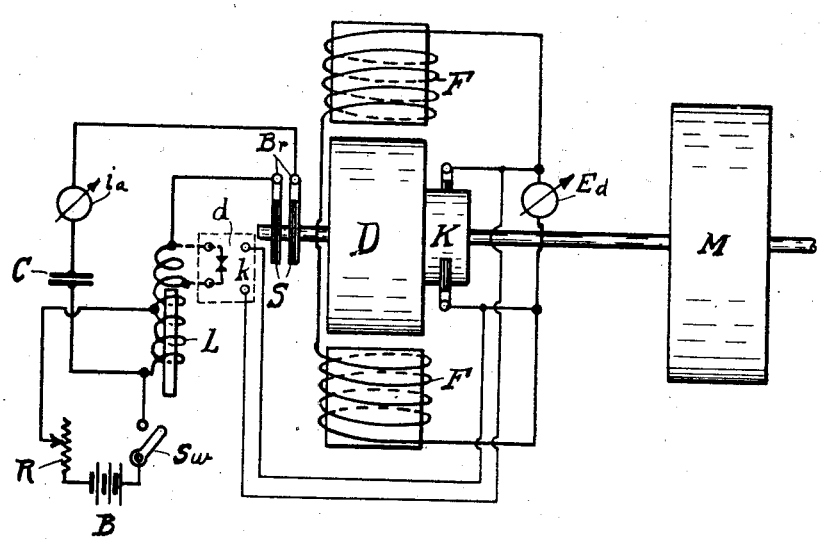
Figure 2:
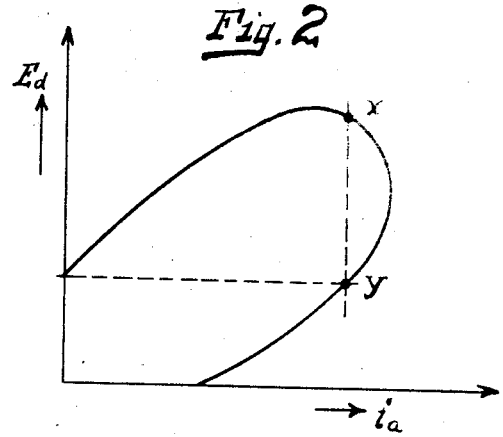

The invention is more fully set forth in the following detailed description taken with reference to the accompanying drawings, of which Fig. 1 is a diagram of connections showing by way of example one form of the invention, and Fig. 2 is a curve illustrating the operation of the device according to Fig. 1.

The invention relates to a system for regulating the voltage or the speed of direct current electric machines in a very practical and simple manner and without any considerable loss of energy. The control of the field excitation, as employed hitherto for this purpose, acts, in most cases, too slowly because of the slow variation of the field. In the majority of cases, even with the smallest practical value of the time constant of the exciter winding, the desired aim of fast regulation will not be attained. This is especially true in cases where an instantaneous regulating action is necessary, as for instance, in the case of high precision regulators for maintaining constant the voltage or the speed of electric machines. Regulators of this type are those acting according to the Tirrill regulating principle, well-known in the art.

According to the present invention, the aforesaid disadvantages inherent in the control of the exciting field of an electric machine are overcome in the following manner:

The armature winding is tapped at two or more suitable points, these tap points are connected across slip-rings to a control alternating current circuit including variable tuning means, for instance, a variable condenser. For heavy currents, however, it is more practical to use a variable inductance coil. This control circuit which is carrying an alternating current is tuned approximately to the frequency of this current, whereby with a slight change in tuning, for instance, by varying the inductance of the coil, it is possible to control over a considerable range the direct current voltage of the machine, in case of a generator, or the speed of rotation, in the case of a motor. Thus, the apparatus of this invention represents a means to control instantly, i. e., without any perceptible time lag, large amounts of power by a sort of relay action. In case of only small amounts of power to be controlled, the phase angle change of the current in the controlling circuit will be sufficient to effect a change of the voltage or of the speed of the machine. For this purpose any well-known phase-shifting means may be included in the control circuit. This latter case represents an ideal relay action, i. e., one without any consumption of energy, and is in this respect similar to the relay action of electronic tubes.

Referring to Fig. 1, M is a prime mover of any kind driving a direct current generator D having the ordinary commutator K with brushes and a field winding F. The machine represented is connected in the well-known parallel or shunt connection of the field with respect to the armature winding. According to this invention, the armature winding is tapped at suitable points in a manner similar to a rotary converter. These taps are connected to slip-rings S, with brushes Br connected to a controlling alternating current circuit, containing electrical tuning means. These latter may consist of a capacity C in series with an iron-cored choke coil L, whose iron core is made movable within the coil L in order to adjust the inductance of the coil. The direct current voltage $E_d$ of the machine will change its value, according to the value of the self-induction of the choke coil L, or in other words, according to the position of the iron core of the coil. The curve of Fig. 2 shows the direct current voltage $Ed$ as ordinate with the alternating control current $i_a$ in the control circuit as abscissa. This curve is obtained in the example shown by varying the length of the part of the iron core introduced into the coil L. The upper part of the curve (point $x$) corresponds to the operation along the one part, and the lower part of the curve (point $y$) corresponds to the operation along the other part of the resonance curve of the alternating current control circuit. In case of large amounts of power to be controlled, which may cause difficulties in providing large enough condenser C, the condenser may be entirely dispensed with. A variable inductance alone will be provided without making use of the resonance phenomena, or else an equivalent device may be substituted in place of the condenser C, such as for instance an over-excited synchronous motor, preferably running at no load.

The invention presents special advantages when employed in connection with well-known high precision regulating devices, for instance, those acting according to the well-known Tirrill principle for maintaining constant the voltage or the speed of rotation of electric machines or else it may be a regulator of speed of the type described in my United States Patent 1,647,020. Generally, these regulators act by closing and opening a regulating resistance included in the shunt circuit of the machine, thereby influencing the voltage or the speed in generators or motors respectively. When employing a regulating device in accordance with the present invention, it will be sufficient to short-circuit and open-circuit a very small part of the windings of the choke coil L by the regulator contacts $k$, in a most simple and easy manner. In the diagram such regulator is shown schematically at R, including the regulating contacts $k$ and input terminals connected to the terminals of the generator D. As is well known, the operation of such regulator, which may be a vibration regulator, may consist in that the period of vibration of the contacts $k$ is varied in accordance with changes of the terminal voltage of the generator D, whereby the mean value of the regulating current through the vibrating contacts is changed in such a manner as to react on the generator to compensate the changes of its terminal voltage.

Another advantage inherent in a regulating system as outlined above, lies in the fact that the regulator contacts will have to carry an alternating current, i. e., one that changes its direction periodically. An uneven transfer of metal from one contact to the other, due to the electrolytical action of the current is thereby avoided and a constant operation of the regulator with a constant precision is readily secured. As has already been stated, the machine represented in Fig. 1 as a direct current generator may also be operated as a motor by connecting it to a direct current supply, as is well known. In this case the variations of the control current $i_a$ serves to effect changes of the speed of rotation, and a speed regulating device may be arranged to act on the control current $i_a$ in order to keep constant the number of revolutions per minute of the machine.

Instead of using a choke coil having a movable iron core, it is possible to use an auxiliary direct current magnetization. This is illustrated in Fig. 1 by a separate circuit with the switch $Sw$, battery B and controlling resistance R. Varying the direct current magnetizing current, e. g., by means of resistance R, large amounts of power may be controlled by comparatively small controlling currents, so that in this case, too, the device presents a practically ideal relay action.

Having described my invention, what I believe to be new and desire to secure and protect by Letters Patent of the United States is:—

1. A system of controlling direct current electric machines through the medium of armature reaction which comprises a tuned auxiliary alternating current circuit including the armature winding of the machine, said circuit being continually closed and means for varying the tuning of said circuit, to change the armature reaction and thereby control said machine.

2. A system for varying the terminal voltage of a direct current generator, an armature winding for said generator tapping points on said armature winding of said generator slip rings connected to said tapping points, an auxiliary alternating current control circuit connected to said slip-rings, said control circuit being continually closed and approximately tuned to the frequency of the armature current, and means to vary the tuning of said control circuit, to change the armature reaction and thereby to control said voltage.

3. A system for varying the terminal voltage of a direct current generator as claimed in claim 2 in which said means comprise a capacity in series with an inductance coil in said alternating control circuit and an adjustable iron core for said coil, to control said voltage.

4. A system for varying the terminal voltage of a direct current generator as claimed in claim 2, in which the tuned alternating current control circuit contains an iron cored choke coil and means for varying its inductance, to control said voltage.

5. A system for varying the terminal voltage of a direct current generator as claimed in claim 2, in which the tuned alternating current control circuit contains an iron cored choke coil and means for producing a variable auxiliary direct current magnetization, to control said voltage.

6. A system for varying the terminal voltage of a direct current generator as claimed in claim 2, in which the tuned alternating current control circuit includes a device dependent on said terminal voltage for varying the phase of the current in said circuit, to control said voltage.

7. A system for maintaining the output voltage of a direct current electric machine at a constant value comprising, in combination, a tuned circuit including the armature winding of said machine tapped at suitable points and connected to slip-rings, an inductance coil, taps on said coil and a vibrating contact voltage regulator controlled by said output voltage, said vibrating contacts connected to the taps on said coil to short-circuit a part of said coil and thereby maintain said output voltage.

8. A system for controlling the operation of direct current machines comprising a direct current machine, taps to secure alternating current from the armature of said machine, a continually closed auxiliary control circuit connected to said taps comprising tuning elements and means for varying said tuning elements in accordance with the magnitude to be controlled to secure said control.

In testimony whereof I have affixed my signature.

KARL SCHMIDT.